3,580,810
FERMENTATIVE PRODUCTION OF L-THREONINE
Isamu Shiio, Kamakura-shi, and Shigeru Nakamori and Kounosuke Sano, Kawasaki-shi, Japan, assignors to Ajinomoto Co., Inc., Tokyo, Japan
No Drawing. Filed July 26, 1968, Ser. No. 747,828
Claims priority, application Japan, July 28, 1967, 42/48,568
Int. Cl. C12b 1/00
U.S. Cl. 195—29                                 4 Claims

ABSTRACT OF THE DISCLOSURE

Certain mutants of *Escherichia coli* which require isoleucine for growth and can grow in the presence of more than 1 mg./l. α-amino-β-hydroxy-valeric acid in an otherwise conventional culture medium produce L-threonine in amounts of several grams per liter of the medium.

---

This invention relates to a method of producing threonine, and more particularly to a method of producing L-threonine by fermentation.

An object of the present invention is to produce threonine at a low cost from readily available raw materials. L-threonine is one of the essential amino acids for animal nutrition. L-threonine has been used in medical research, as an intermediate in the production of other compounds valuable to biochemists and as a food additive.

It has been reported in U.S. Patent No. 3,099,604 that microorganisms can produce L-threonine in a medium containing L-homoserine as a substrate. However, the cost of L-homoserine is higher than that of other carbon sources such as sugars. It has also been known that some mutant strains of *Escherichia coli* which require diaminopimelic acid and methionine for their growth and some mutant strains of *Micrococcus glutamicus* which require methionine and lysine for their growth can produce L threonine in a medium by fermentation.

We have now found that some mutant strains of genus Escherichia, which are characterized by their resistance to α-amino-β-hydroxyvaleric acid and by requiring isoleucine, can produce and accumulate a substantial amount of L-threonine in a culture medium.

The microorganisms employed in the present invention are characterized by the following four features:

(1) They are members of the genus Escherichia.
(2) They can not grow on the Davis' minimal medium but can grow the medium when it includes isoleucine.
(3) They can grow on the medium including isoleucine and 1 mg./ml. of α-amino-β-hydroxyvaleric acid.
(4) They produce and accumulate L-threonine in the medium.

Microorganisms which require other nutrients together with isoleucine are also employed for the present method.

Representative microorganisms employed in the present method are *Escherichia coli* β I-67 (ATCC 21278) and *Escherichia coli* β IM-4 (ATCC 21277), both of which are obtained from *Escherichia coli* PB-8 (which requires proline and thiamine for its growth). These strains are available from the American Type Culture Committee.

Table I shows the relative growth of *Escherichia coli* PB-8 which is sensitive to α-amino-β-hydroxyvaleric acid but requires proline and thiamine for its growth, and of *Escherichia coli* β-133 which a mutant resistant to α-amino-β-hydroxyvaleric acid at elevated concentrations of α-amino-β-hydroxyvaleric acid.

TABLE 1

| Concentration of α-amino β-hydroxy-valeric acid (mg./l.) | Relative growth | |
|---|---|---|
| | *Escherichia coli* PB-8 | *Escherichia coli* β-133 |
| 0 | 100 | 100 |
| 0.50 | 32 | 102 |
| 0.75 | 21 | 103 |
| 1.0 | 13 | 94 |
| 2.0 | 10 | 105 |
| 3.0 | 9 | 98 |

NOTE.—The fermentation was carried out at 37° C. for 40 hrs. employing 3 ml. of the under-mentioned minimal medium containing α-amino-β-hydroxyvaleric acid in the amount mentioned in Table 1 and growth was compared after 24 hours' fermentation.

Minimal medium:
$KH_2PO_4$—8.46 g./l.
KOH—2.26 g./l.
Sodium citrate—1.0 g./l.
$(NH_4)_2SO_4$—1.0 g./l.
$MgSO_4$—0.2 g./l.
Glucose—5.0 g/l.
Proline—50 mg./l.
Thiamine HCl—1 mg./l.

NOTE.—This minimal medium was prepared by adding proline and thiamine HCl to the Davis' minimal medium.

As it is apparent from Table 1, the growth of the parent microorganisms (*Escherichia coli* PB-8) is inhibited when α-amino-β-hydroxyvaleric acid is added to a medium in an amount of more than 0.5 mg./ml., but the growth of the mutant is not reduced.

These resistant mutants may be obtained by screening from natural sources or by the conventional artificial mutant inducing methods.

The α-amino-β-hydroxyvaleric acid employed in the present invention is available as a reagent from California Biochemical Corporation.

The culture medium employed for producing L-threonine in our method may be entirely conventional. It must contain an assimilable carbon source, an assimilable nitrogen source, and the usual minor nutrients. The carbon sources suitable for use in the present invention are glucose, maltose, fructose, sucrose, starch hydrolyzate, and molasses. Organic acids such as acetic acid and citric acid, alcohols and hydrocarbons are also employed as carbon sources. A nitrogen source may be provided by ammonium salts of inorganic acids such as ammonium sulfate and ammonium chloride, or by ammonia in an aqueous solution or in the gaseous state. Organic compounds, such as amino acids, urea, or protein hydrolyzate may also be used. The inorganic minor nutrients may provide phosphate, calcium, magnesium, iron, manganese and like ions is conventional.

The organic growth promoting agents which improve the yield and the rate of production of L-threonine include amino acids, various vitamins, soya bean protein hydrolysate, yeast extract, corn steep liquor, peptone, casein hydrolyzate and the like. Isoleucine which is required for the growth of the microorganisms employed, is also added to the medium.

The fermentation is carried out between 20° and 40° C. for about 24 to 72 hours under aerobic conditions with shaking or aeration and agitation, controlling the pH value of the medium between 4 and 9. When the pH of the medium tends to fall, it is adjusted with calcium carbonate or aqueous ammonia. When organic acids are employed as carbon sources, the pH of the medium tends to rise, and it is adjusted with hydrogen chloride or sulphuric acid.

The recovery of L-threonine from the cultured broth may follow known methods. The bacterial cells may be removed by filtration or by centrifuging, and L-threonine may be recovered by means of a cation-exchange resin of the H type in combination with partial evaporation of the eluate under reduced pressure and precipitation of threonine from the concentrate.

L-threonine in the broth is determined by microbioassay with *Streptococcus faecalis* (ATCC 8043). The product of the present invention is identified as L-threonine by its mobility in electrophoresis, its biological activity in microbioassay and its Rf value in paper chromatography.

The following examples are further illustrative of the invention, but it will be appreciated that the invention is not limited thereto.

EXAMPLE 1

A culture medium was prepared to the following composition:

Glucose—30 g./l.
Ammonium sulphate—10 g./l.
Potassium dihydrogen phosphate—2 g./l.
Magnesium sulphate—1 g./l.
$Fe^{++}$—2 p.p.m.
$Mn^{++}$—2 p.p.m.
Proline—300 mg./l.
Thiamine HCl—1 mg./l.
Isoleucine—100 mg./l.
Methionine—100 mg./l.
Calcium carbonate—20 g./l.

20 milliliter batches of the above-mentioned medium were placed in 500 ml. shaking flasks, and sterilized by steam in the flasks at 110° C. for 5 minutes. Each microorganism shown in table was inoculated into the culture medium and cultivated under aerobic conditions at 37° C. for 48 hours. The amount of L-threonine accumulated in each cultured broth was as shown in the table.

TABLE 2

| Microorganism | Nutrients required | Resistance to α-A-β-HV [1] | L-threonine accumulated (g./l.) |
|---|---|---|---|
| E. coli PB-8 | Proline, thiamine | − | 0.00 |
| E. coli β-101 | do | + | 1.87 |
| E. coli β-133 | do | + | 1.20 |
| E. coli PBI-6 | Proline, thiamine, isoleucine. | − | 0.01 |
| E. coli βI-67 | do | + | 4.70 |
| E. coli βIM-4 | Proline, Thiamine isoleucine, methionine. | + | 6.20 |

[1] α-amino-β-hydroxyvaleric acid.

EXAMPLE 2

A culture medium was prepared to the following composition:

Glucose—30 g./l.
Ammonium sulphate—10 g./l.
Potassium dihydrogen phosphate—2 g./l.
Magnesium sulphate—1 g./l.
$Fe^{++}$—2 p.p.m.
$Mn^{++}$—2 p.p.m.
Proline—300 mg./l.
Thiamine HCl—1 mg./l.
Isoleucine—cf. table
Calcium carbonate—20 g./l.

20 milliliter batches of the above-mentioned medium were placed in 500 ml. shaking flasks, and sterilized by steam at 110° C. for 5 minutes.

*Escherichia coli* β I-67 (ATCC 21278) was inoculated into the culture medium, and cultivated under aerobic conditions at 37° C. for 48 hours.

The amount of L-threonine accumulated was as follows:

TABLE 3

| Conc. of isoleucine (mg./l.) | Accumulated L-threonine, (g./l.) |
|---|---|
| 100 | 4.31 |
| 1000 | 2.62 |

EXAMPLE 3

*Escherichia coli* βIM-4 (ATCC 21277) was inoculated into the culture medium of Example 1 modified to contain 1000 mg./l. of methionine and 1000 mg./l. of L-threonine and fermentation was carried out as in Example 1.

2.39 g./l. of L-threonine were found in the broth.

EXAMPLE 4

*Escherichia coli* βIM-4 and *Escherichia coli* βI-67 were inoculated into the medium of Example 1 modified to contain 30 g./l. of glycerine instead of glucose, and the fermentation was carried out under the same conditions as in Example 1.

The amounts of L-threonine accumulated in the cultured broth were as follows:

TABLE 4

| Microorganism: | L-threonine accumulated, (g./l.) |
|---|---|
| E. coli βIM-4 | 3.6 |
| E. coli βI-67 | 2.71 |

What we claim is:
1. A method of producing L-threonine which comprises culturing a threonine-producing micro-organism belonging to the species *Escherichia coli*, which is resistant to α-amino-β-hydroxyvaleric acid and requires at least isoleucine for its growth, under aerobic conditions in a medium containing sources of assimilable carbon and nitrogen, inorganic substances, and minor nutrients required including isoleucine while maintaining the pH value of the medium within the range of 4–9, whereby L-threonine is produced in said medium, and recovering the L-threonine produced.

2. A method as set forth in claim 1, wherein said source of assimilable carbon is selected from the group consisting of carbohydrates and organic acids, and said source of assimilable nitrogen is selected from a group consisting of ammonia, ammonium salts and urea.

3. A method as set forth in claim 1, wherein said microorganism is *Escherichia coli* βI-67 (ATCC 21278).

4. A method as set forth in claim 1, wherein said microorganism is *Escherichia coli* βIM-4 (ATCC 21277).

References Cited

Cohen et al. "Threonine Synthesizing," J. Bacteriology, vol. 67, pp. 182–190, 1954.

A. LOUIS MONACELL, Primary Examiner

G. M. NATH, Assistant Examiner

U.S. Cl. X.R.
195—47